United States Patent [19]
Nakamura

[11] Patent Number: 5,732,805
[45] Date of Patent: Mar. 31, 1998

[54] LOCK DEVICE OF OUTPUT SHAFT

[76] Inventor: Daijiro Nakamura, 662-2, Shimogishi-cho, Ono, Hyogo-Pref, Japan

[21] Appl. No.: 688,435

[22] Filed: Jul. 30, 1996

[51] Int. Cl.$^6$ .................................................. F16D 59/00
[52] U.S. Cl. ............................... 192/8 R; 192/150
[58] Field of Search .................. 192/7, 8 R, 144, 192/150; 184/134; 475/175, 178

[56] References Cited

U.S. PATENT DOCUMENTS

| | | | |
|---|---|---|---|
| 4,480,733 | 11/1984 | Grimm et al. | 192/8 R |
| 5,277,527 | 1/1994 | Yokota et al. | 192/150 X |
| 5,624,013 | 4/1997 | Tsai | 192/8 R |

*Primary Examiner*—Richard M. Lorence
*Attorney, Agent, or Firm*—Moonray Kojima

[57] ABSTRACT

A lock device of output shaft capable of stopping the output shaft quickly when the output shaft is controlled to stop, and locking to prevent the output shaft from rotating when the output shaft side is stopped against the drive side. The output shaft is formed by connection of drive shaft and driven shaft. Play for a specific angle is formed in mutual rotating direction, at a junction of connection of the drive shaft and driven shaft. A holding plate is fixed to the driven shaft side confronting the drive shaft in the axial center direction. An annular lock ring forming a lock pawl on the outer circumference is held movably to concentric position and eccentric position, at the holding plate side. A lock operation member is provided in the drive shaft confronting the lock ring, for allowing the lock ring to move to the concentric position when the play at the junction of the drive shaft and driven shaft is eliminated by initial rotation of rotation of drive shaft, and allowing to move to the eccentric position when rotation of the drive shaft is stopped to return a play at the junction by reaction. A internal ring forming a pawl for locking mutual rotation by mutually engaging with the lock pawl on the outer circumference of the lock ring when the lock ring is moved to the eccentric position is formed oppositely on the outer circumference of the lock ring.

3 Claims, 11 Drawing Sheets

LOCK DEVICE OF OUTPUT SHAFT

SPECIFICATION

DETAILED DESCRIPTION OF THE INVENTION

1. [Technical Field of the Invention]

The present invention relates to a lock device of output shaft capable of stopping the output shaft promptly when the motor is controlled to stop, for example, in the output shaft for producing the motor torque.

2. [Prior Art]

In manual work, for instance, by attaching various tools by mounting a chuck on the output shaft of a power tool, if the power switch is turned off, the output shaft continues to rotate by inertia of chuck or tool, and if the power tool is released from the hand during this rotation, the tool is rotating and is very dangerous. It is therefore preferred that the output shaft be stopped immediately when the power switch is turned off.

In the chuck, there is known a chuck with a torque-up function capable of tightening or detaching the tool, only by turning the operation ring by hand, without having to use a chuck handle, but when using such chuck with torque-up function, while the motor power source is off, the output shaft of the power tool is free to rotate. If an attempt is made to tighten the chuck by hand, the output shaft also rotates and it cannot be tightened by hand. Hence it is needed to fix the output shaft by one hand, and the controllability is poor because of hand tightening of the chuck and holding of the tool. Accordingly, it is desired that the output shaft of the power tool be locked while the motor power source is off.

[SUMMARY OF THE INVENTION]

Accordingly, the invention features the following constitution. That is, in the lock device of output shaft of the invention, the output shaft is formed by connection of drive shaft and driven shaft, a play for a specific angle is formed in mutual rotating direction, at a junction of connection of the drive shaft and driven shaft, a holding plate is fixed to the driven shaft side confronting the drive shaft in the axial center direction, an annular lock ring forming a lock pawl on the outer circumference is held movably to concentric position and eccentric position, at the holding plate side where the holding plate and drive shaft are opposite to each other, a lock operation member is provided in the drive shaft confronting the lock ring, for allowing the lock ring to move to the concentric position when the play at the junction of the drive shaft and driven shaft is eliminated by initial rotation of rotation of drive shaft, and allowing to move to the eccentric position when rotation of the drive shaft is stopped to return a play at the junction by reaction, and an internal ring forming a pawl for locking mutual rotation by mutually engaging with the lock pawl on the outer circumference of the lock ring when the lock ring is moved to the eccentric position is formed oppositely on the outer circumference of the lock ring.

Moreover, in the lock device of output shaft, the internal ring is held rotatably in the fixing part, and a torque limiter is formed by pressing and fixing the internal ring with a specified load. Also in the lock device of output shaft, the internal ring is held rotatably in the fixing part, and a brake is formed by pressing and fixing the internal ring with a specified load.

It is hence a primary object of the invention to provide a lock device of output shaft capable of stopping the output shaft immediately when the output shaft is controlled to stop, and locking the output shaft so as not to rotate while the output shaft is stopped against the control side.

It is other object of the invention to provide a lock device of output shaft allowing to work safely without any danger by immediately stopping rotation of the output shaft by inertial of chuck or tool, when the power tool is released from hand immediately after canceling the drive of the output shaft by the above lock, for instance, in the case of manual work by attaching various tools by mounting the chuck on the output shaft.

It is a further object of the invention to provide a lock device of output shaft enhanced in controllability, realizing easy and secure hand tightening and facilitating chuck hand tightening and tool holding, because the output shaft does not rotate when tightening the chuck by hand, when using, for example, a chuck with torque-up function.

It is a further different object of the invention to provide a lock device of output shaft capable of preventing breakdown of the structure, by stopping gradually by torque limiter or brake, when there is risk of breakdown of the structure due to overload to the output shaft side, when lock is applied immediately when canceling the drive of the drive shaft, owing to excessive inertia of the load side connected to the output shaft.

BRIEF DESCRIPTION OF THE DRAWINGS

Embodiments of the invention are illustrated in the following drawings.

DETAILED DESCRIPTION OF THE PREFERRED EMBODIMENTS

An embodiment of the invention is described according to the drawings below. An embodiment shows an example of a lock device of output shaft of the invention applied in the output shaft of a hand type power tool, and in FIG. 1, and output shaft 10 is driven by rotation of a motor shaft 11 of a motor (not shown), and between the motor shaft 11 and output shaft 10, there is a lock device incorporating a reduction mechanism.

Figure 1:
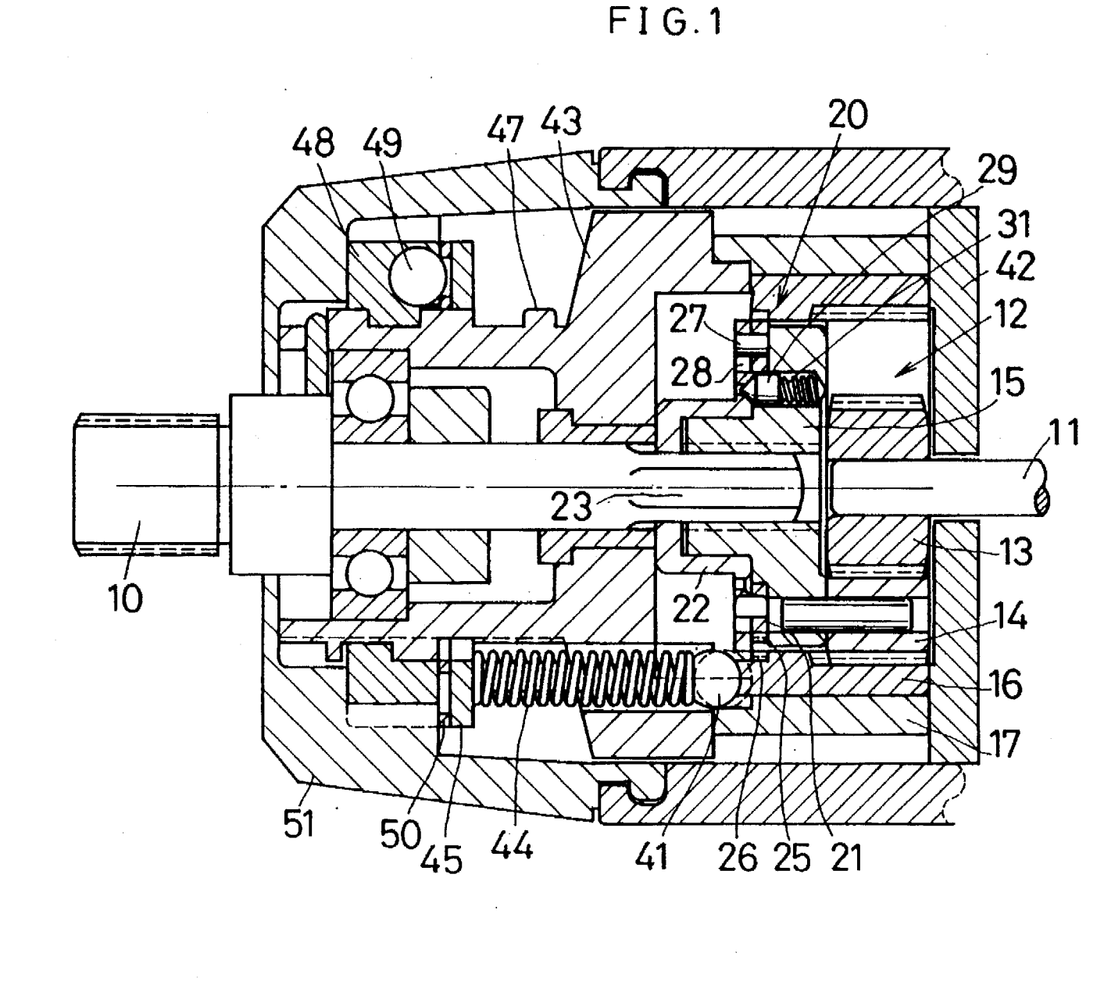
FIG. 1 is a sectional view of a lock device of output shaft.

The motor shaft 11 is connected to a sun gear 13 of a planet gear mechanism 12 so as to transmit rotation. The planet gear mechanism comprises, aside from the sun gear 13, a planet gear 14 engaged with the sun gear 13, a carrier 15 on which the planet gear 14 is pivoted, an internal gear 16 engaged with the planet gear 14, and a fixing ring 17, and having a known reduction function, its reduction output is produced from the carrier 15.

Figure 2:
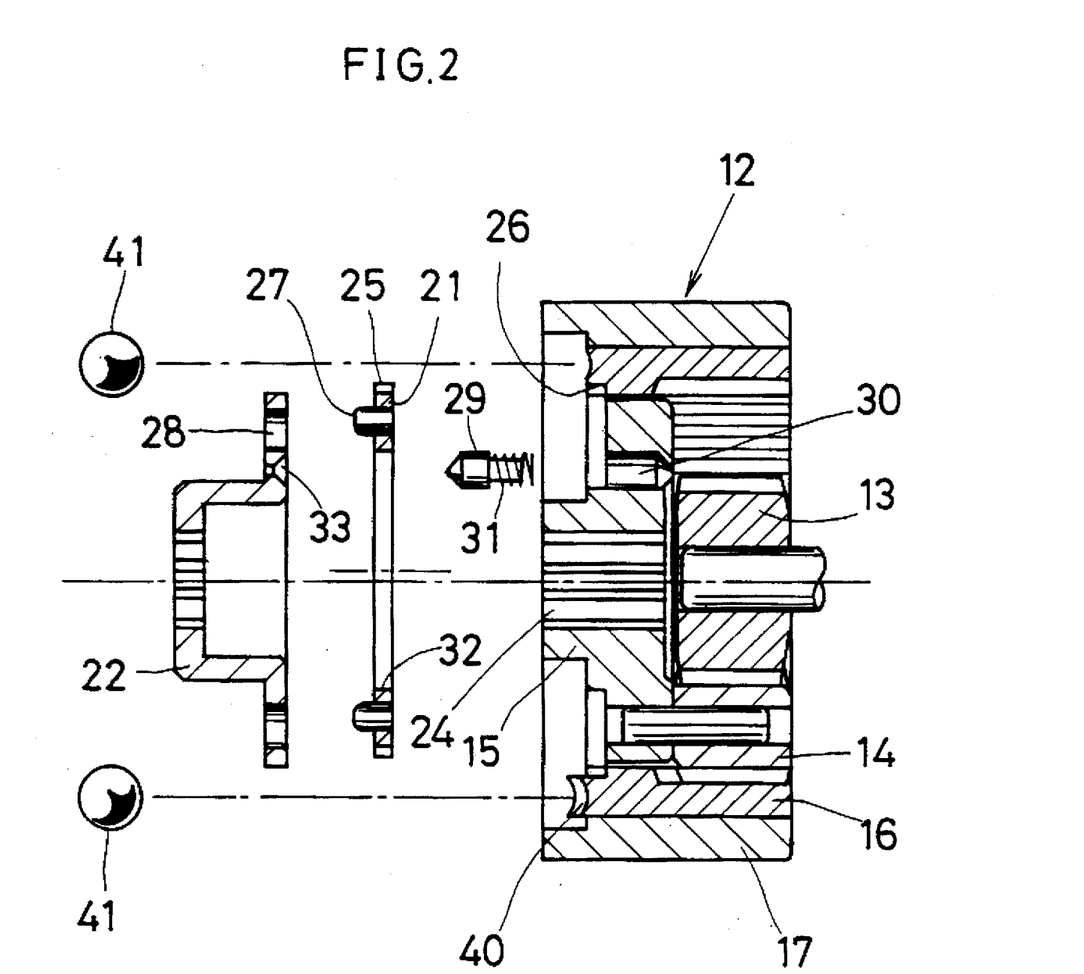
FIG. 2 is a partial exploded view of a lock device area.

As shown also in FIG. 2, a lock device 20 for locking the output shaft 10 is composed of the carrier 15, a lock ring 21 opposite thereto, a holding plate 22 of flanged cap shape for holding it, and the internal gear 16 for locking the rotation of the lock ring 21.

Figure 5:
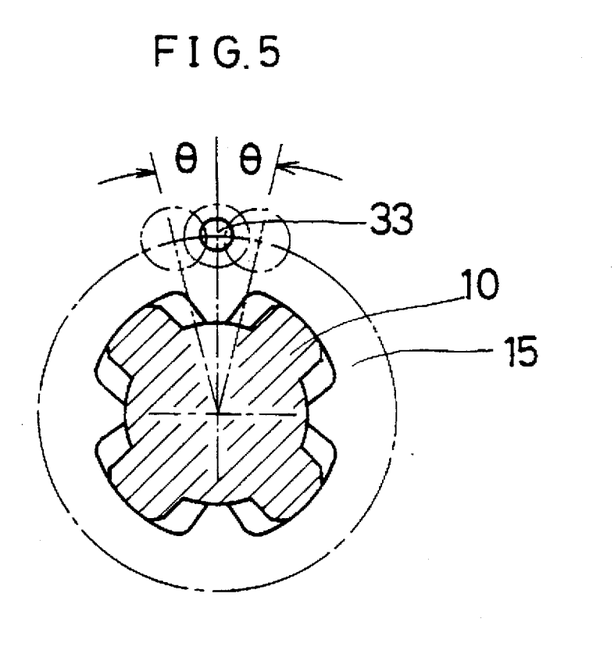
FIG. 5 is a sectional view of spline fitting part of carrier output shaft.

The axial center of the carrier 15 and the inner end of the output shaft 10 are connected so as to transmit rotation by mutual fitting through spline 23, 24, and this spline fitting 23, 24 forms a play of a specific angle θ each in normal and reverse rotating directions from one neutral position as shown in FIG. 5.

The central part of the holding plate 22 is fitted without play to the spline 23 of the output shaft 10, and fixed so as to rotate together.

Supposing the carrier 15 to be the drive side, the output shaft 10 may be regarded as the driven side, and the holding plate 22 is fixed to the inner side of the output shaft 10 of the drive side opposite in the axial center direction to the drive side carrier 15.

The lock ring 21 forms a gear 25 confronting the lock pawl on its outer circumference, supports movably in the radial direction so as to move to the concentric position or eccentric position on the shaft of the carrier 15. When the lock ring 21 moves to the eccentric position, the gear 25 is engaged with a gear 26 of the internal gear 16 confronting on the outer circumference, thereby locking rotation of the lock ring 21.

Besides, on the side confronting the holding plate 22 of the lock ring 21, a plurality of regulation pins 27 are plated, and on the side of the holding plate 22 confronting the regulation pins 27, regulation holes 28 for loosely fitting the regulation pins 27 are formed, and the regulation holes 28 are set in a hole diameter in a size for regulating the position of regulation pins 27 correspondingly so that the lock ring 21 may be movable to the eccentric position and concentric position.

Figure 3:
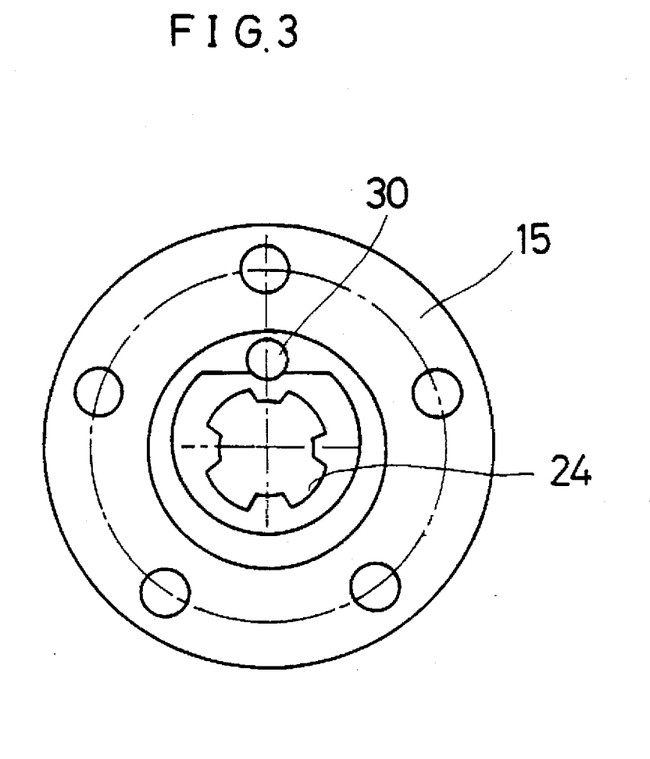
FIG. 3 is an inner side view of a carrier.

On the side of the carrier 15 confronting the holding plate 22, as shown also in FIG. 3, there is an accommodation hole 30 for accommodating an operation pin 29 slidably in the axial center direction, and the operation pin 29 is accommodated in the accommodating hole 30 as being thrust to the holding plate 22 side by a spring 31.

The leading end of the operation pin 29 is formed in a conical form, and this conical side (shape slope) contacts with the inner circumference 32 of the lock ring 21, and further by pushing by sliding in the axial direction, the lock ring 21 can be moved to the eccentric position.

That is, as shown in FIG. 5, corresponding to the neutral position of the play to the output shaft 10 of the carrier 15, an engagement hole 33 to be engaged with the conical side of the operation pin 29 is formed in the holding plate 22 confronting the operation pin 29. When the operation pin 29 is engaged with the engagement hole 33 and is thrust by the spring 31, it contacts with the inner circumference 32 of the lock ring 21 on the conical side of the leading end, and by pressing it in the outer circumferential direction, the lock ring 21 is moved to the eccentric position, and the gear 25 on its outer circumference is engaged with the gear 26 of the internal gear 16, thereby locking the rotation of the lock ring 21. When the carrier 15 rotates, for example, by normal or reverse rotation of the motor shaft 11, and turns by the play angle θ against the holding plate 22, the leading end of the operation bin 29 is detached from the engagement hole 33 by resisting the spring 31, and rides on the side surface of the holding plate 22, and the conical side of the operation pin 29 is detached from the inner circumference 32 of the lock ring 21, thereby allowing the lock ring 21 to move to the concentric position with the output shaft 10.

In this cases, when torque is transmitted to the lock ring 21 (transmission from the holding plate 22 side), since the lock ring 21 is formed in a ring form of nearly equal circumference, and a centripetal force acts by its rotation to rotate at the concentric position with the output shaft 10, so that the gear 25 of the outer circumference will not be engaged with the gear 26 of the internal gear 17.

In the planet gear mechanism 12, the internal gear 16 is freely supported on the fixing ring 17, the outer end of the internal gear 16 is formed in a rough surface 40, and a ball 41 is bonded therewith to press the internal gear 16 to the fixing plate 42 side, and by defining its rotation, a torque limiter is composed.

Figure 4:
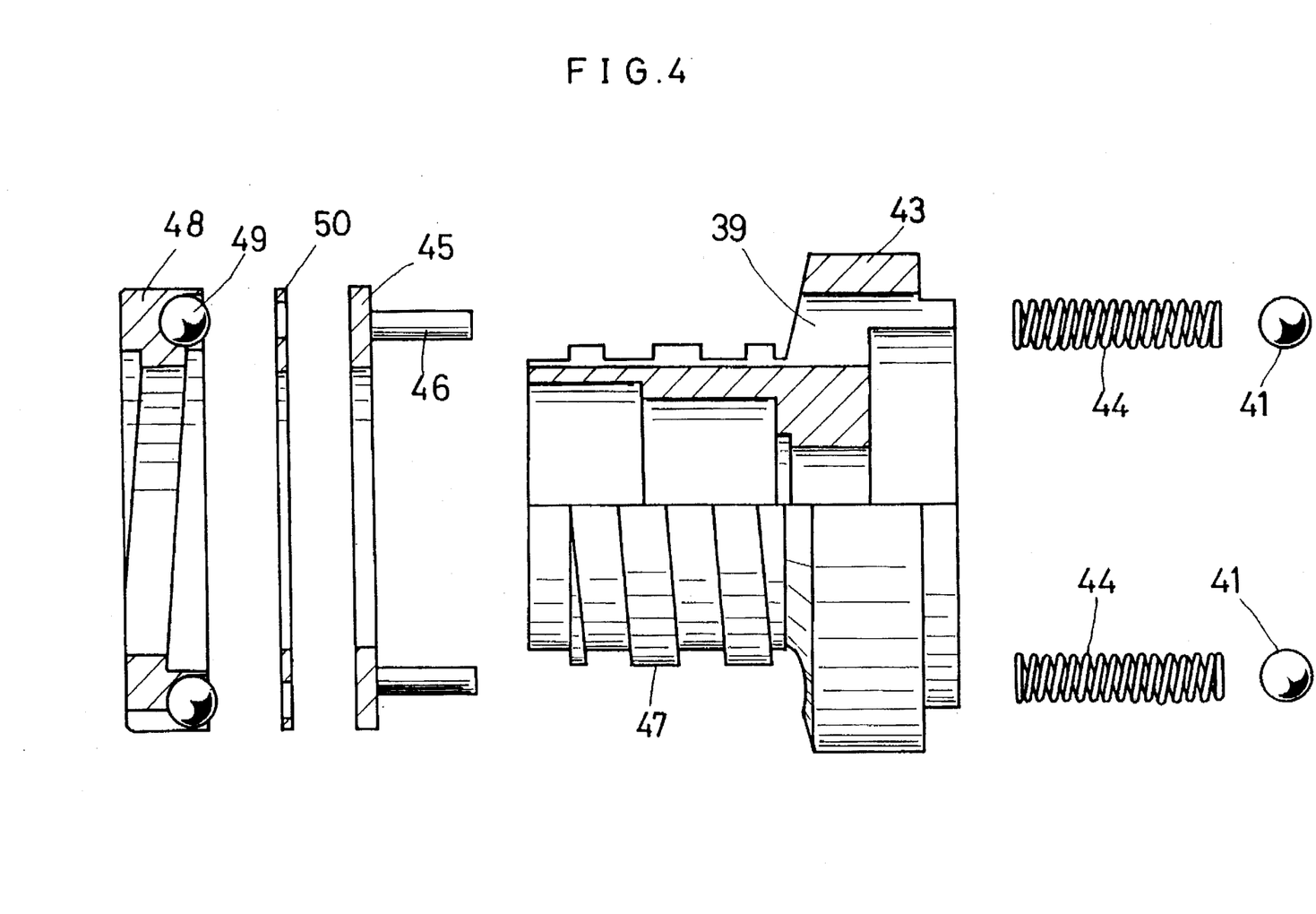
FIG. 4 is a perspective view of torque limiter mechanical section.

As shown also in FIG. 4, a plurality (for example, six) balls 41 confront each other, and a fixing member 42 is opposite to the position confronting the outer end of the internal gear 16, and at the side opposite to the internal gear 16 of the fixing member 43 and at the position corresponding to the ball 41, a spring 44 for pressing the ball 41 is accommodated, and the outer end of the spring 44 is supported as a support pin 46 of a receiving member 45 is inserted.

A screw 47 of square threads is formed on the outer circumference of the fixing member 43, and a nut member 48 is engaged with the screw 47. The backward move of the nut member 48 is transmitted through a ball 49 and a ring 50 to move the receiving member 45 in the axial direction. By adjusting the elasticity of the spring 44, the torque of the torque limiter can be adjusted by the rough surface 40 of the internal gear 16 and the balls 41.

The nut member 48 is connected to the operation cover 51, for example, by spline fitting, so that the rotation may be transmitted, while allowing sliding in the axial direction, and by rotating the operation cover 51, the nut member 48 may be rotated. Meanwhile, the fixing plate 42, fixing ring 17, and fixing member 43 are integrally coupled by proper linkage mechanism so as to constitute a fixed state.

The operation of the constituted lock device of the output shaft 10 is described below.

Figure 6:
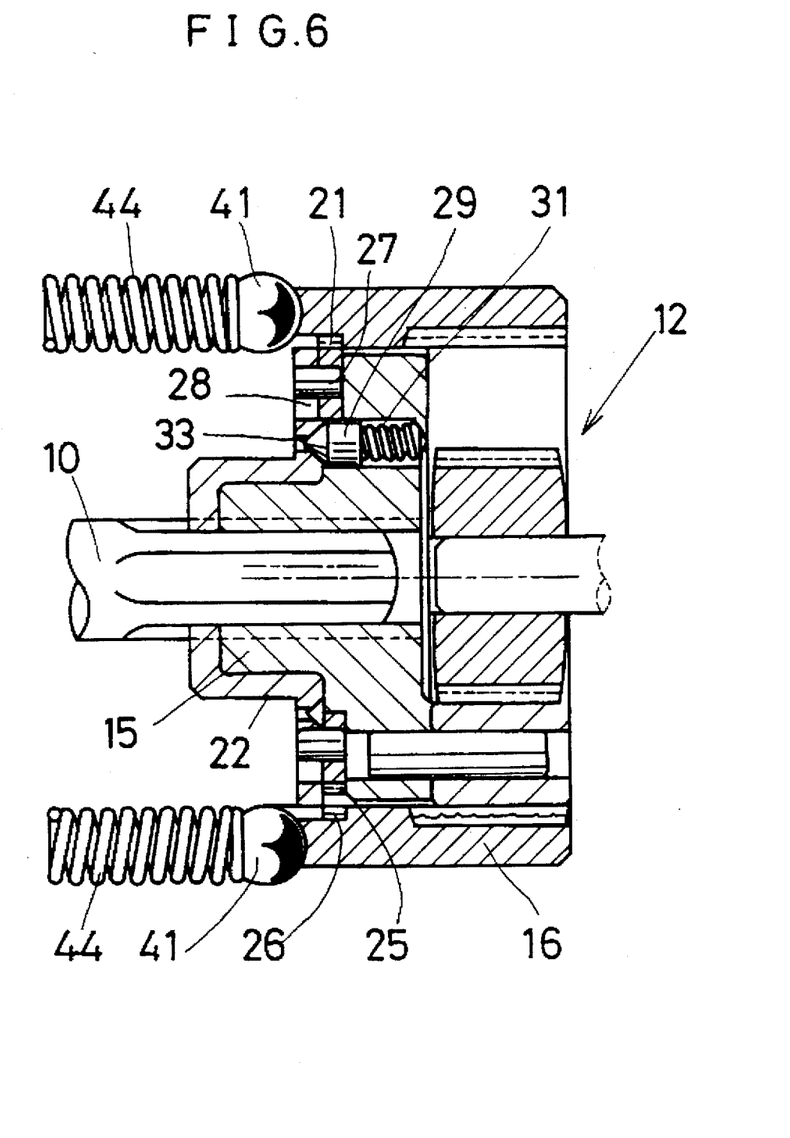
FIG. 6 is a sectional view showing locked state of the lock device.
Figure 7:
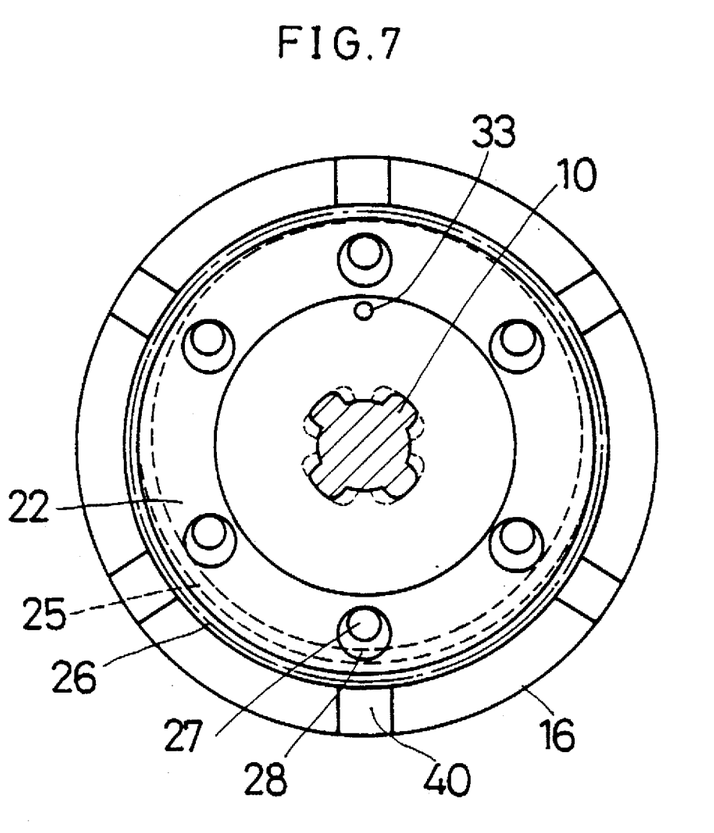
FIG. 7 is an outer side view showing locked state of the lock device.
Figure 8:
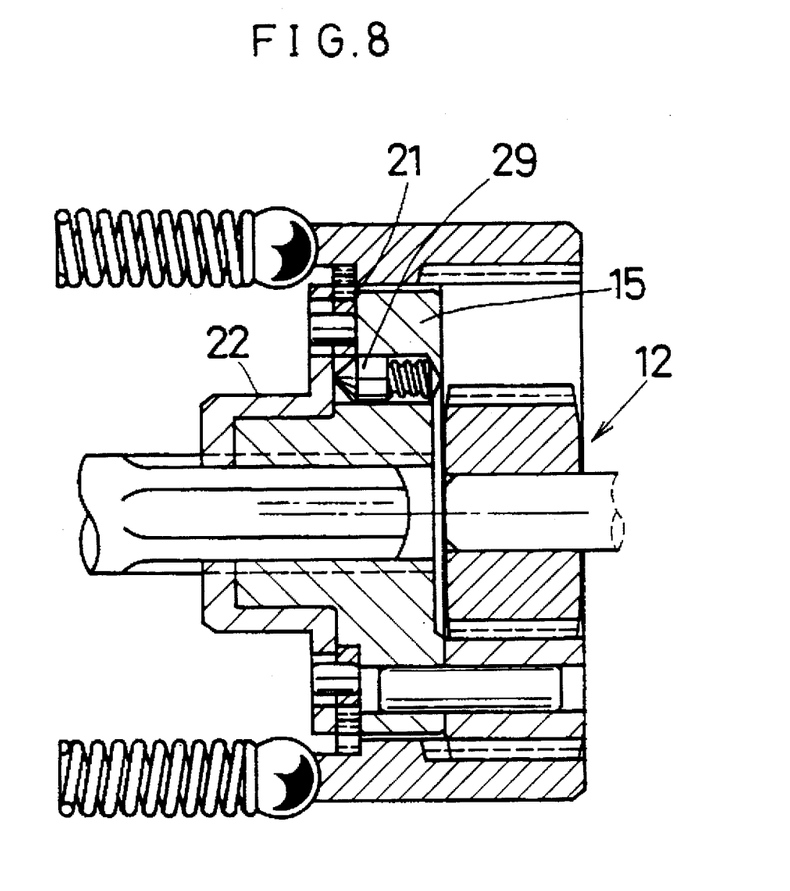
FIG. 8 is a sectional view showing unlocked state of the lock device.
Figure 9:
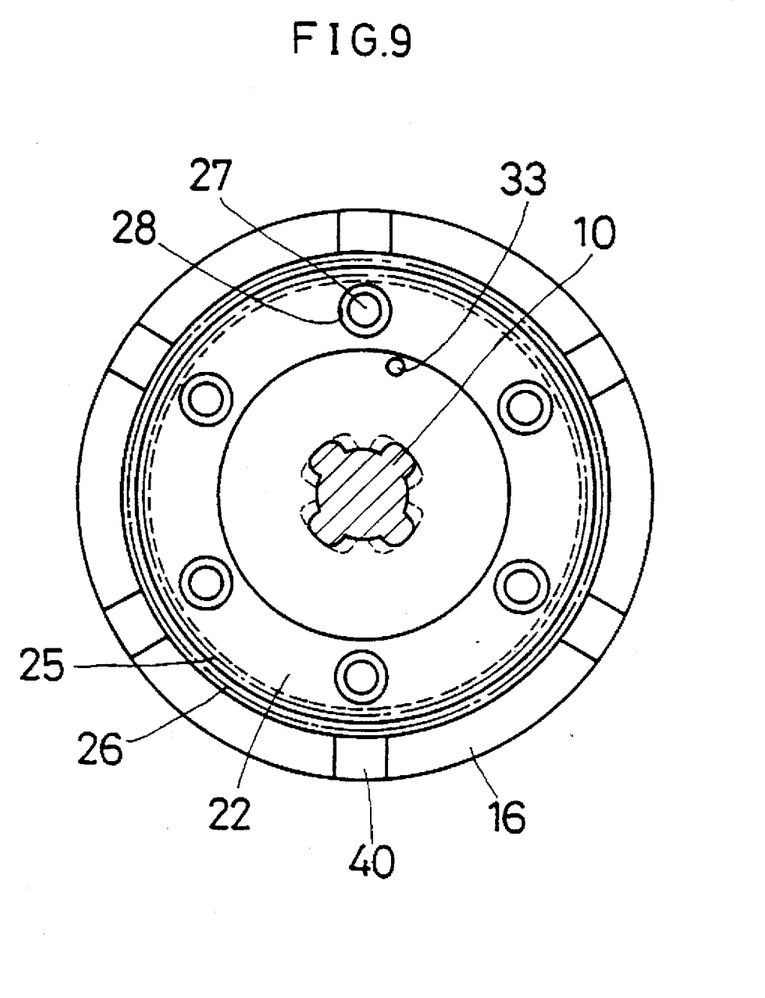
FIG. 9 is an outer side view showing unlocked state of the lock device.

In FIG. 1, FIG. 6, and FIG. 7, the motor shaft 11 is stopped, the operation pin 29 presses the inner circumference 32 of the lock ring 21 to the eccentric position side by its conical side, and its leading end is thrust and engaged in the engagement hole 33 of the holding plate 22. Accordingly, the gear 25 of the lock ring 21 is engaged with the gear 26 of the internal gear 16 which is defined in rotation, and is hence in a locked state.

In this state, when manual rotation is applied, for example, from the output shaft 10 side, this rotation will not turn the carrier 15 which has a play angle θ, but since there is no play angle against the holding plate 22, this holding plate 22 receives the torque of the output shaft 10, and the torque is transmitted to the lock ring 21 through the regulation hole 28 and regulation pin 27. However, since the gear 25 of the lock ring 21 is engaged with the gear 26 of the internal gear 16 which is defined of rotation by the elasticity of the spring 44 as mentioned above, it will not be rotated. Therefore, the output shaft 10 is in a locked state, and manual turning is prevented.

Incidentally, when the manual rotation by the output shaft 10 exceeds the elastic force of the spring 44, the internal gear 17 turns by resisting the pressure of the spring 44, so that the torque limiter functions.

Thus, when the rotation of the output shaft 10 is in a locked state, the output shaft 10 does not turn. Thus it is easier to mount a tool on this output shaft 10.

In this way, when the output shaft 10 in a locked state is rotated by drive of the motor shaft 11, the motor may be directly driven and the motor shaft 11 is turned in a specified direction.

This rotation of the motor shaft 11 is reduced by the planet gear mechanism 12 and is produced from the carrier 15, but since there is a play angle θ between the carrier 15 and spline 23, 24 of the output shaft 10, first the carrier 15 turns by the portion of this play angle q, then the torque is transmitted to the output shaft 10. When the carrier 15 turns by the portion of the play angle θ the operation pin 29 is detached from the engagement hole 33 by resisting the spring 31, and rides on the side of the holding plate 22. Thus, the conical side of the operation pin 29 is detached from the inner circumference 32 of the lock ring 21, so that the lock ring 21 is allowed to move to the concentric position with the output shaft 10.

In this case, when the torque is transmitted to the lock ring 21 (transmitted from the holding plate 22 side), since the lock ring 21 is formed in a ring of a nearly uniform circumference, a centripetal force acts by its rotation to turn at the concentric position with the output shaft 10, and the gear 25 of its outer circumference will not be engaged with the gear 26 of the internal gear 17.

As a result, the locked state of the lock ring 21 is cleared, and the output shaft 10 is rotated by the driving force of the motor shaft 11. In the drive state of the output shaft 10, meanwhile, when an overload acts on the output shaft 10 and this load exceeds the elastic force of the spring 44, the internal gear 16 turns by resisting the pressure of the spring 44, so that the torque limiter functions.

Consequently, when the motor in the drive state is stopped and rotation of the motor shaft 11 is stopped, by lowering the torque of the motor shaft 11, if the inertia of the output shaft 10 side increases (reaction from stopping of the motor shaft 11), the rotation of the output shaft 10 precedes the carrier 15. By the preceding action, mutual play angles θ move reversely to return the operation pin 29 to the neutral position, and the operation pin 29 presses the inner circumference 32 of the lock ring 21 to the eccentric position side by its conical side, and its leading end is thrust and fitted with the engagement hole 33 of the holding plate 22. As a result, the lock ring 21 is engaged with the gear 26 of the internal gear 16 defined of rotation, so as to be in a locked state.

Therefore, when the motor shaft 11 stops, the output shaft 10 is immediately stopped of its rotation, is enhanced.

Incidentally, when the rotation by inertia of the output shaft 10 exceeds the elastic force by the spring 44, the internal gear 16 turns of resisting the pressure of the spring 44, so that the torque limiter functions.

In this embodiment, by forming the rough surface 40 of the inner end side of the internal gear 16 in a flat plane, and changing the ball 41 into brake pad, a brake mechanism is composed in the corresponding area, and the torque limiter may be composed as a brake mechanism.

Figure 10:
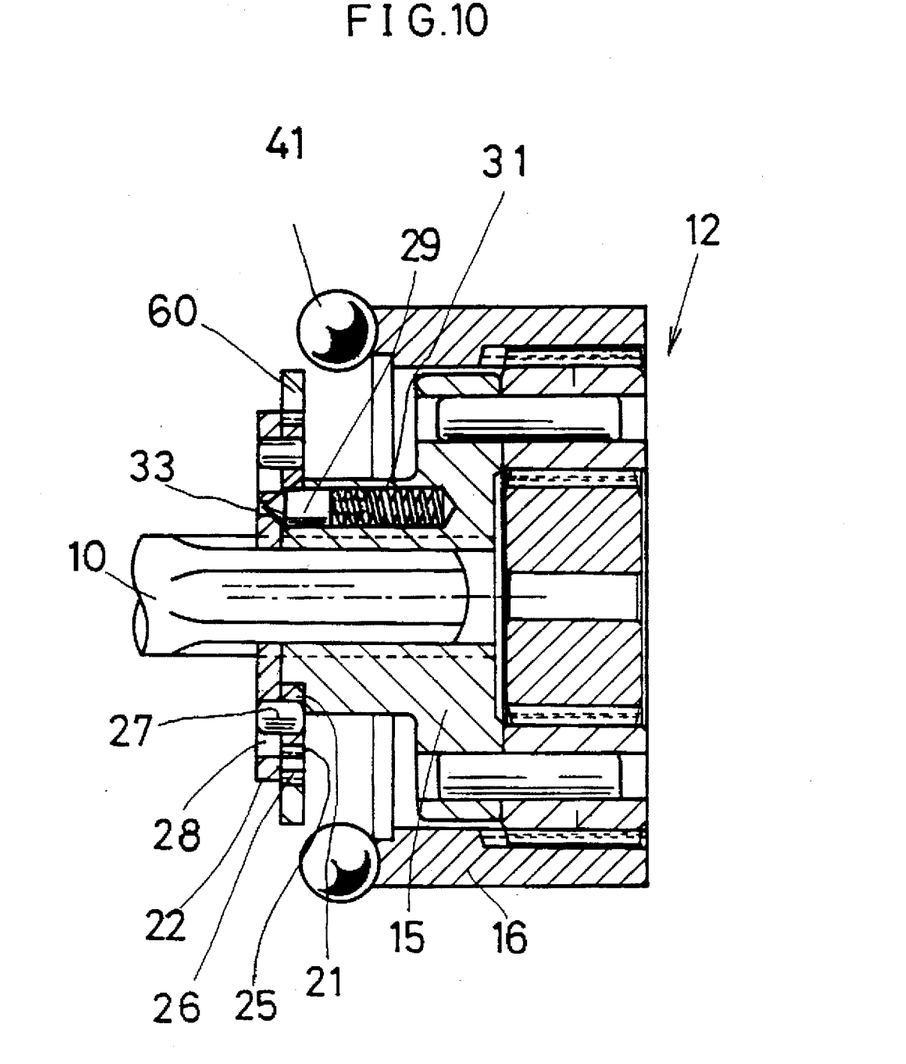
FIG. 10 is a sectional view showing locked state in other embodiment of the lock device.
Figure 11:
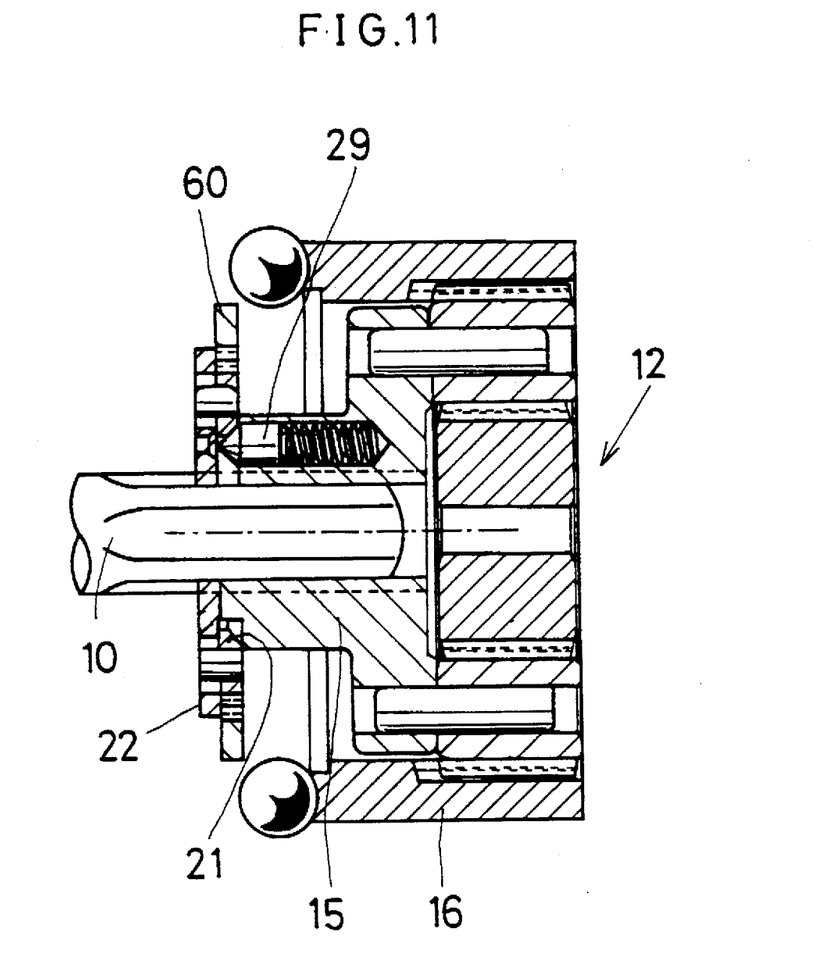
FIG. 11 is a sectional view showing unlocked state in other embodiment of the lock device.

FIG. 10 and FIG. 11 show other embodiment, in which an internal ring 60 forming a gear 26 to be engaged with the gear 25 of the lock ring 21 is disposed in the inner circumference, at the confronting position on the outer circumference of the lock ring 21, and this internal ring 60 is held in a state being fixed to the fixing member 43 in FIG. 1.

In the embodiment shown in FIG. 1, by the engagement of the gear 26 of the internal gear 16 with the gear 25 of the lock ring, the torque limiter function can be utilized, but this embodiment is different from the embodiment shown in FIG. 1 in that it lacks the function of torque limiter. Other constituent elements having the same functions are identified with same reference numerals, and their explanations are omitted.

In this embodiment, FIG. 10 shows a locked state, and FIG. 11 shows an unlocked state.

What is claimed is:

1. A locking device for locking an output shaft formed by connection of a drive shaft and a driven shaft, said device comprising:

means for allowing movement from a central position to outward positions in opposite rotary directions at a connection joint between said drive shaft and said driven shaft;

holding plate means disposed on said driven shaft and confronting said drive shaft in an axial direction;

lock means comprising a lock pawl means disposed on an outer circumference thereof and movably disposed to be in a concentric position or an eccentric position and located near said driven shaft and between said holding plate means and said drive shaft;

lock operating means provided on said drive shaft confrontin said lock means for allowing said lock means to move to said concentric position when said means for allowing movement causes movement to a central position by rotation of said drive shaft, and for allowing said lock means to move to said eccentric position when rotation of said drive shaft is stopped and said means for allowing movement causes movement to an outward position by reaction; and internal ring means comprising pawl means for engaging said pawl means of said lock means when said lock means is moved to said eccentric position.

2. The device of claim 1, further comprising:

means for rotatably holding said internal ring; and means for applying a specified load to said internal ring means so as to form a torque limiter.

3. The device of claim 1, further comprising:

means for rotatably holding said internal ring; and means for applying a specified load to said internal ring means so as to form a brake.

* * * * *